(12) United States Patent
Goel et al.

(10) Patent No.: US 9,158,881 B2
(45) Date of Patent: Oct. 13, 2015

(54) INTERPOSER DEFECT COVERAGE METRIC AND METHOD TO MAXIMIZE THE SAME

(71) Applicant: Taiwan Semiconductor Manufacturing Company, Ltd., Hsin-Chu (TW)

(72) Inventors: Sandeep Kumar Goel, Dublin, CA (US); Ashok Mehta, Los Gatos, CA (US)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 71 days.

(21) Appl. No.: 14/087,650

(22) Filed: Nov. 22, 2013

(65) Prior Publication Data
US 2015/0058819 A1 Feb. 26, 2015

Related U.S. Application Data

(60) Provisional application No. 61/868,462, filed on Aug. 21, 2013.

(51) Int. Cl.
*G06F 17/50* (2006.01)
*G01R 31/28* (2006.01)
*H01L 21/66* (2006.01)

(52) U.S. Cl.
CPC ........ *G06F 17/5077* (2013.01); *G01R 31/2851* (2013.01); *H01L 22/00* (2013.01); *G06F 2217/14* (2013.01); *G06F 2217/40* (2013.01)

(58) Field of Classification Search
CPC .................. G06F 17/5077; G06F 17/5068
USPC ........................................ 716/126, 128, 137
See application file for complete search history.

(56) References Cited

U.S. PATENT DOCUMENTS

| | | | |
|---|---|---|---|
| 2007/0018672 A1* | 1/2007 | Jacobsen et al. | 324/765 |
| 2012/0273782 A1* | 11/2012 | Goel et al. | 257/48 |
| 2013/0326463 A1* | 12/2013 | Chuang et al. | 716/137 |

OTHER PUBLICATIONS

U.S. Appl. No. 13/484,531, filed May 31, 2012, for "Method to Determine Optimal Micro-Bump-Probe Pad Pairing for Efficient PGD Testing in Interposer Designs," 22 pages of text, 12 pages of drawings.

* cited by examiner

*Primary Examiner* — Suresh Memula
(74) *Attorney, Agent, or Firm* — Haynes and Boone, LLP

(57) ABSTRACT

Provided is a method of assigning a first set of probe pads to an interposer for maximizing a defect coverage for the interposer. The interposer includes a second set of nets and the defect coverage is based on a ratio between a tested net length and an overall net length. The method includes processing the second set such that every net interconnecting more than two micro-bumps is divided into a plurality of nets and every two of the more than two micro-bumps are interconnected by one of the plurality of nets. The method further includes calculating an untested length of each net in the second set; selecting a first net from the second set with the maximum untested length; selecting two probe pads from the first set based on a user-defined cost function; and connecting the two probe pads to the first net with two dummy nets.

20 Claims, 9 Drawing Sheets

INTERPOSER DEFECT COVERAGE METRIC AND METHOD TO MAXIMIZE THE SAME

This patent claims the benefit of U.S. Prov. No. 61/868,462 entitled "Interposer Defect Coverage Metric and Method to Maximize the Same," filed Aug. 21, 2013, herein incorporated by reference in its entirety.

BACKGROUND

Ongoing trends in semiconductor device technology include miniaturization of feature size of semiconductor devices as well as increasing functional complexity of semiconductor devices. Although a feature size reduction may facilitate an increase in the number of semiconductor building blocks per unit area of a semiconductor device, e.g. a die or an integrated circuit (IC), thus facilitating more complex functionality per device, many demands for the increased functional complexity cannot be met by a single device.

Recently, this has led to the development of aggregate devices such as three-dimensional integrated circuits (3D ICs), also called multi-die ICs or hybrid ICs. One example of creating a 3D IC is to place active dies on a silicon interposer, which in turn is placed on a package substrate. The interposer provides die-to-die connections through micro-bumps on a first side of the interposer and die-to-package connections through bumps (or pads) on a second side of the interposer. The micro-bumps are connected by interconnects (or nets) through the interposer. The interposer further includes through-silicon vias (TSV) connecting the micro-bumps and bumps. The various micro-bumps, bumps, nets, and TSVs may include manufacturing defects and need to be tested.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
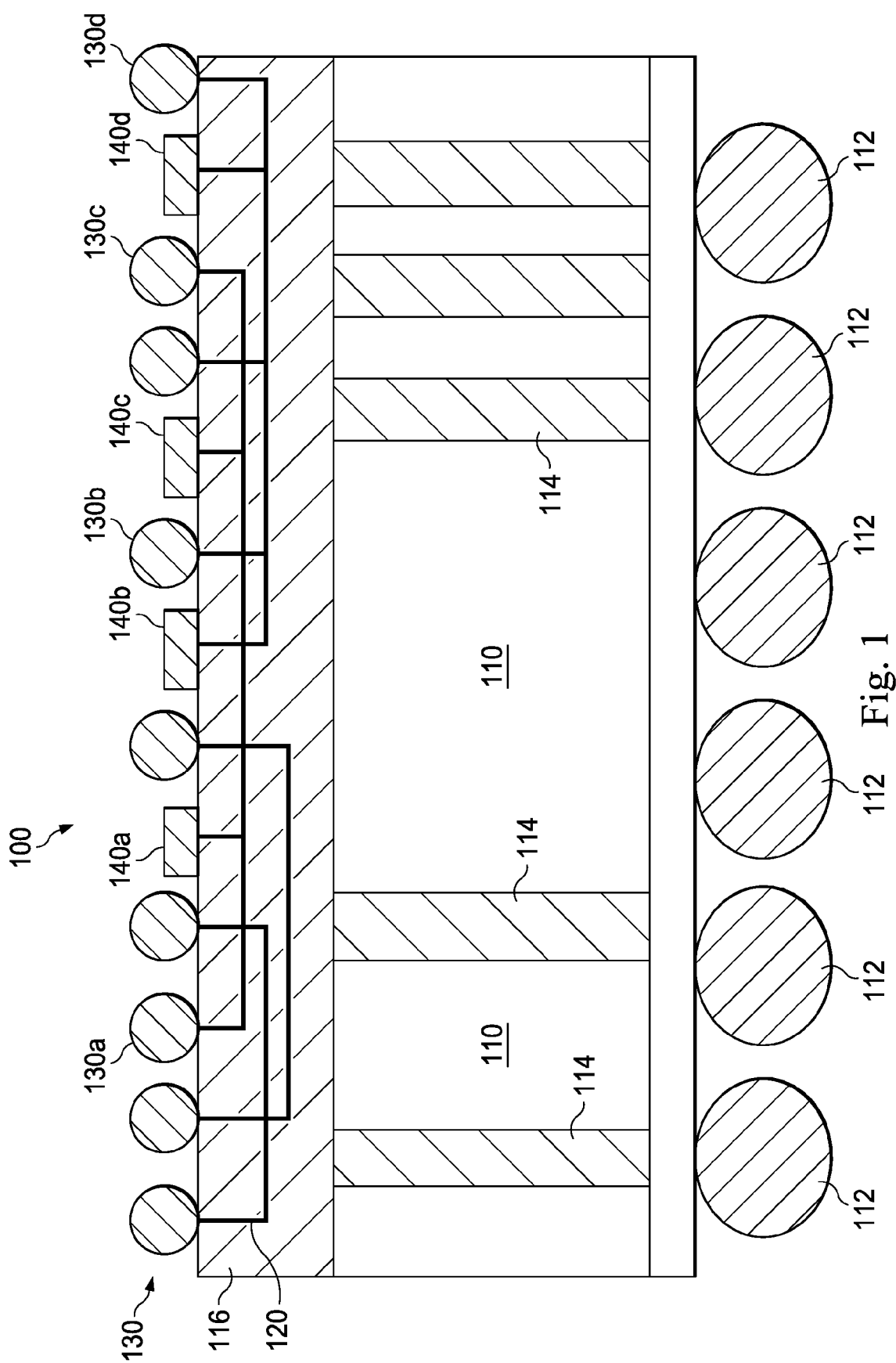
FIG. 1 is a diagrammatic cross sectional view of an interposer with test structures according to various aspects of the present disclosure.

The following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the performance of a first process before a second process in the description that follows may include embodiments in which the second process is performed immediately after the first process, and may also include embodiments in which additional processes may be performed between the first and second processes. Various features may be arbitrarily drawn in different scales for the sake of simplicity and clarity. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

FIG. 1 is a diagrammatic cross sectional view of an interposer 100 according to various aspects of the present disclosure. Referring to FIG. 1, the interposer 100 includes a substrate 110; a redistribution layer (RDL) 116 that is adjacent to the substrate 110; a plurality of bumps 112 disposed on a surface (not labeled) of the interposer 100; and a plurality of micro-bumps 130, including micro-bumps 130a-d, disposed on another surface (not labeled) of the interposer 100. The bumps 112 are used for connecting the interposer 100 to a package substrate (not shown). The micro-bumps 130 are used for coupling the interposer 100 to one or more dies (not shown) for integrating the dies in a 3D IC. The bumps 112 and a portion of the micro-bumps 130 are electrically coupled through the RDL 116 and a plurality of TSVs 114 in the substrate 110. The interposer 100 further includes a plurality of nets (or interconnects) 120 interconnecting the micro-bumps 130 for providing connections among the dies through the RDL 116.

In some embodiments, the substrate 110 may include an elementary semiconductor including silicon or germanium in crystal, polycrystalline, or an amorphous structure; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; any other suitable material; or combinations thereof. In an embodiment, the alloy semiconductor substrate may have a gradient SiGe feature in which the Si and Ge composition change from one ratio at one location to another ratio at another location of the gradient SiGe feature. In another embodiment, the alloy SiGe is formed over a silicon substrate. In another embodiment, a SiGe substrate is strained. Furthermore, the semiconductor substrate may be a semiconductor on insulator, such as silicon on insulator (SOI), or a thin film transistor (TFT). In some examples, the semiconductor substrate may include a doped epitaxial (epi) layer or a buried layer. In other examples, the compound semiconductor substrate may have a multilayer structure, or the substrate may include a multilayer compound semiconductor structure.

In some embodiments, the RDL 116 can include a plurality of electrical connection structures, such as via plugs, contact plugs, dual damascene structures, damascene structures, metallic routing lines, other electrical connection structures, and/or any combinations thereof. In some embodiments, electrical connection structures of the RDL 116 can be made of at least one material, such as tungsten, aluminum, copper, titanium, tantalum, titanium nitride, tantalum nitride, nickel silicide, cobalt silicide, other proper conductive materials, and/or combinations thereof.

In some embodiments, the bumps 112 and micro-bumps 130 can each be disposed on respective bonding pads (not shown). The bonding pads can be made of at least one material, such as copper (Cu), aluminum (Al), aluminum copper (AlCu), aluminum silicon copper (AlSiCu), or other conductive material or various combinations thereof. In some embodiments, the bonding pads may include an under bump metallization (UBM) layer. In some embodiments, the bumps 112 and micro-bumps 130 can each be made of at least one material, such as a lead-free alloy (e.g., gold (Au), a tin/silver/copper (Sn/Ag/Cu) alloy, or other lead-free alloys), a lead-containing alloy (e.g., a lead/tin (Pb/Sn) alloy), copper, aluminum, aluminum copper, conductive polymer, other bump metal materials, or any combinations thereof.

In the present embodiment, the interposer 100 is a passive interposer that only contains metal wires and possibly decoupling capacitors. In another embodiment, the interposer 100 may be an active interposer that may contain standard logic elements such as transistors and logic gates in addition to components found in a passive interposer.

The nets 120 may include different types of nets, such as a feed through net, an inter-die net, or a fan-out net. For example, a feed through net is a single connection connecting one of the micro-bumps 130 to one of the bumps 112. For example, an inter-die net connects one of the micro-bumps 130 associated with a first die with another one of the micro-bumps 130 associated with another die. For example, a fan-out net connects a plurality of micro-bumps 130 together.

During manufacturing processes, various defects may be introduced to the interposer 100. For example, some of the nets 120 may be shorted to some other nets or broken into disconnected nets. To uncover defects, the interposer 100 further includes a plurality of probe pads 140a-d. The probe pads 140a-d are paired and each pair is selectively connected to one of the nets for detecting defects on the net, for example, by applying stimulus on one of the pairing probe pads and observing outputs on the other probe pad. The number of bumps, micro-bumps, and probe pads as shown in FIG. 1 is merely an example and does not limit the inventive scope of the present disclosure.

There are generally a limited number of probe pads available compared to the number of nets existent in an interposer. Consequently, all nets are not connected to probe pads. Furthermore, connecting a pair of probe pads to a net introduces additional cost to the interposer, such as extra loading and capacitance on the net. Given a number of (pairs of) probe pads, it is thus desirable to know how to select a set of nets to be connected to the probe pads such that an overall test coverage of an interposer is maximized. To do that, it is beneficial to know how the test coverage of the interposer is measured. The present disclosure provides various test coverage metrics that closely reflect interposer defect coverage, and provides various methods for assigning nets to probe pads so as to maximize the test coverage based on a chosen metric.

Figure 2A:
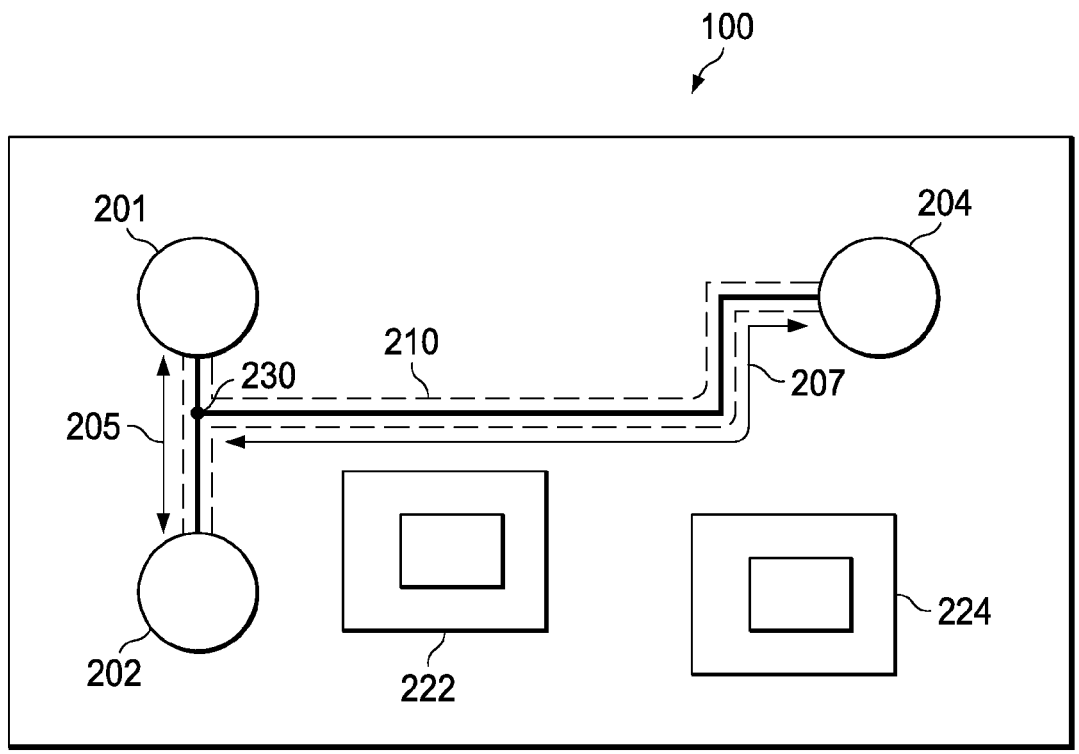
FIGS. 2A-2E are diagrammatic top views of a portion of an interposer with test structures according to various aspects of the present disclosure.

FIG. 2A illustrates a portion of the interposer 100 that includes three micro-bumps 201, 202, and 204; a net 210 connecting the three micro-bumps; and a pair of probe pads 222 and 224 to be used for testing the connectivity of the three micro-bumps. The net 210 includes two net segments 205 and 207 which join at a net joint 230.

For the sake of simplicity, let "ICT" denote a test coverage of the interposer 100, "$L_{overall}$" a total length of nets (or interconnects or connections) in the interposer 100, and "$L_{tested}$" a total length of nets (or interconnects or connections) in the interposer 100 that are tested by probe pads, such as the probe pads 222 and 224 (FIG. 2A), the following metric is used in the present disclosure:

$$ICT = \frac{L_{tested}}{L_{overall}} \quad (1)$$

FIGS. 3, 4A-4B, and 5A-5B illustrate methods of assigning a plurality of probe pad pairs to an interposer that includes a set of nets to be tested according to various aspects of the present disclosure. FIGS. 3, 4A-4B, and 5A-5B will be discussed in conjunction with FIGS. 2A-2E, using the portion of the interposer 100 in FIG. 2A as an example. In the following discussion, the untested length of a net n is denoted as $l_n$. As will be explained later, a portion of the net n may be tested during some operations and its untested length $l_n$ will be reduced accordingly.

Figure 3:
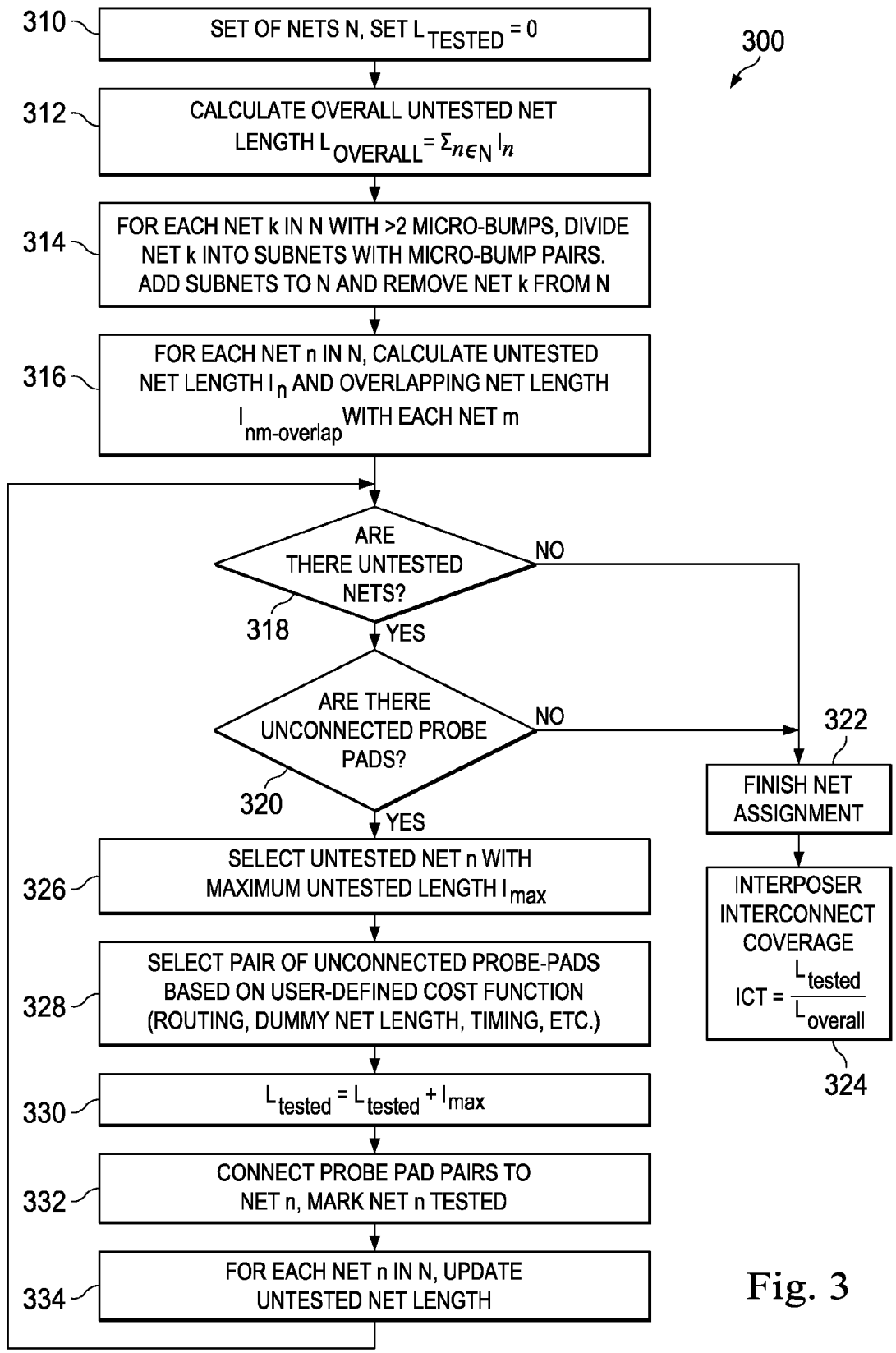
FIGS. 3, 4A-4B, and 5A-5B are methods of assigning probe pads to interposer interconnecting nets in order to achieve enhanced test coverage according to various aspects of the present disclosure.

FIG. 3 shows an embodiment of a method 300 for maximizing ICT of the interposer 100 with $L_{overall}$ and $L_{tested}$ calculated according to various aspects of the present disclosure.

The method 300 (FIG. 3) clears the $L_{tested}$ in operation 310 ($L_{tested}=0$) and initializes a set of nets to be tested, N, to logically include all nets in the interposer 100, which includes the net 210 (FIG. 2A).

The method 300 (FIG. 3) proceeds to operation 312 to calculate an overall net length to be tested as a summation of the untested length of all nets in the set N. For a net connecting more than two micro-bumps, the length of the net is a summation of all net segments. For example, the length of the net 210 is a summation of the length of the net segments 205 and 207 (FIG. 2A). In addition, at operation 312, the untested length of a net n equals the length of the net n. The overall net length to be tested is expressed as:

$$L_{overall} = \sum_{n \in N} l_n \quad (2)$$

The method 300 (FIG. 3) proceeds to operation 314 where every net in the set N that connects more than two micro-bumps is replaced with a plurality of subnets such that each of the subnets is a portion of the net and every two of the more than two micro-bumps are connected by one of the subnets. For a net with k micro-bumps, there are k*(k−1)/2 subnets. For example, in an embodiment with reference to FIG. 2A, the net 210 is replaced with three subnets, a subnet 210a connecting the micro-bumps 202 and 204 which includes the net segment 207 (FIG. 2B), a subnet 210b connecting the micro-bumps 201 and 202 (FIG. 2C), and a subnet 210c connecting the micro-bumps 201 and 204 which also includes the net segment 207 (FIG. 2D). The aforementioned replacement only occurs in the set N which is a logical representation of the nets in the interposer 100, and it does not alter the physical connection of the nets in the interposer 100 (FIG. 2A). In the following discussion, a subnet is also called a net for the sake of convenience. At operation 314, all nets in N are marked as "untested." A net remains as "untested" until all net segments between the two micro-bumps connected by the net are marked as "tested."

The method 300 (FIG. 3) proceeds to operation 316 where an untested (or to-be-tested) length of every net in the set N is calculated. In an embodiment, the calculation is based on a design layout data of the interposer 100. At operation 316, the untested length of a net is generally the same as the length of the net. However, a portion of the net may overlap with another net and becomes tested when the other net is tested. When that happens, the untested length of the net will be reduced by the overlapping portion. For example, the net 210a (FIG. 2B) overlaps with the net 210c (FIG. 2D) by the net segment 207. When the net 210a is tested during an operation, the untested length of the net 210c is reduced by the length of the net segment 207. In an embodiment, operation 316 calculates a portion of the net n that overlaps with another net m for each net m in the set N. The overlapping portion of the nets n and m is denoted as $l_{nm-overlap}$, which can be used to update the untested length of the net n when the net m is tested, or vice versa.

The method 300 (FIG. 3) proceeds to operation 318 to check if there is any net in the set N that has not been connected to and tested by some probe pads. If all nets have been tested, the method 300 finishes the net and probe pad assignments in operation 322 and derives final test coverage in operation 324 by using Equation (1) above. Alternatively, operation 318 may employ different criteria for transitioning to operation 322. For example, one of the criteria is that the maximum untested length among all nets in the set N is less than a predetermined value.

The method 300 (FIG. 3) proceeds to operation 320 to check if there are any probe pad pairs available for testing some nets in the set N. The number of probe pads available in an interposer is limited by various factors, such as the available surface area of the interposer for placing probe pads in addition to the micro-bumps already thereon, the number of tester channels available in a piece of test equipment used to test the interposer, etc. If all probe pads have been connected to some nets in previous operations, the method 300 finishes the net and probe pad assignments in operation 322 and derives final test coverage in operation 324 by using Equation (1) above.

The method 300 (FIG. 3) proceeds to operation 326 to select a net for testing. In the present embodiment, a net with the maximum untested length ($l_{max}$) among the "untested" nets is selected. This is due to observations that longer nets are more likely to be affected by random defects in the interposer 100. For illustrative purposes with the present example, the net 210a (FIG. 2B) is selected.

The method 300 (FIG. 3) proceeds to operation 328 to select a pair of unconnected probe pads for connecting and testing the net 210a selected in operation 326 above. In the present embodiment, selection of the probe pads is based on a user-defined cost function which may take into account various factors, such as routing congestion of the interposer 100, particularly in the local areas of the net 210a and the available probe pads; length of additional nets to be inserted for connecting the probe pads to the selected net 210a; power consumption of the additional nets; timing constraints of the selected net 210a (and/or 210) in lieu of extra loading by the additional nets, and so on. For illustrative purposes with reference to FIG. 2B, the probe pads 222 and 224 are selected.

The method 300 (FIG. 3) proceeds to operation 330 to update the $L_{tested}$ to include the length of the selected net 210a.

$$L_{tested} = L_{tested} + l_{max} \quad (3)$$

Figure 2B:
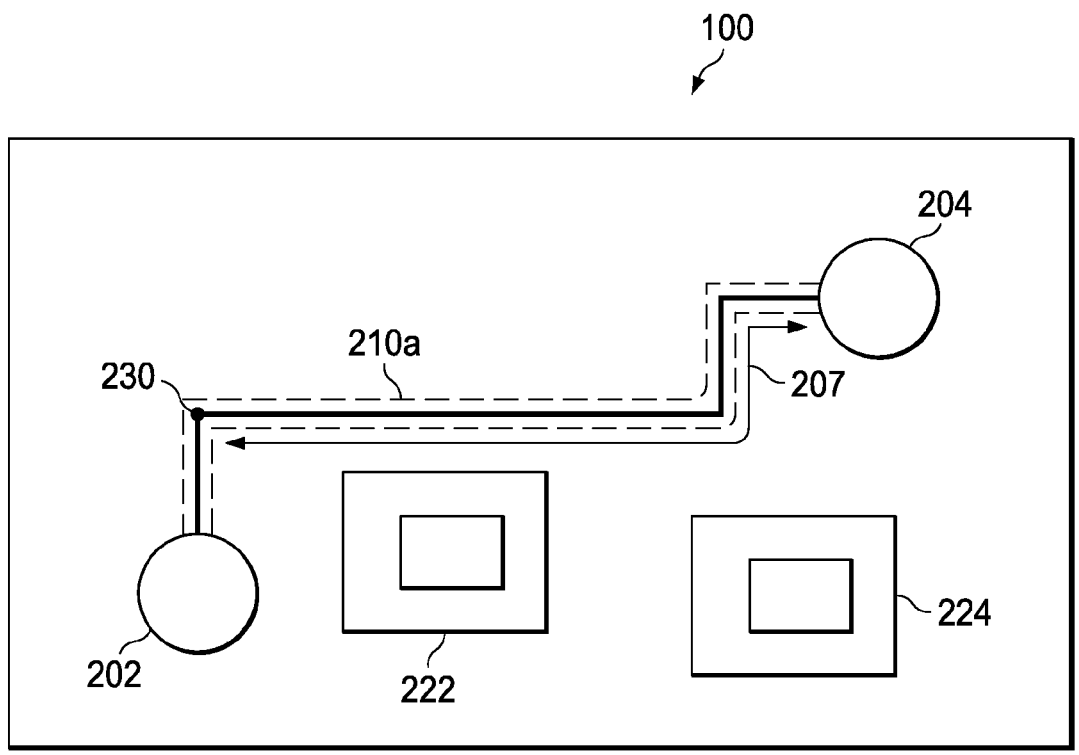
Figure 2C:
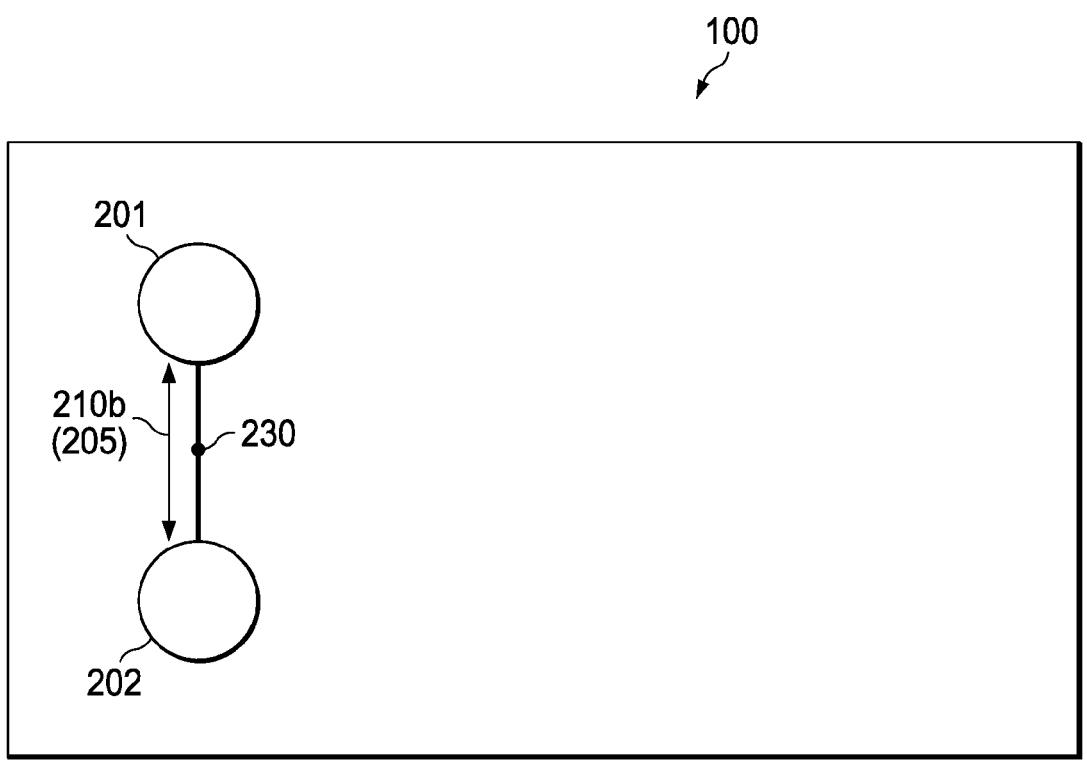
Figure 2D:
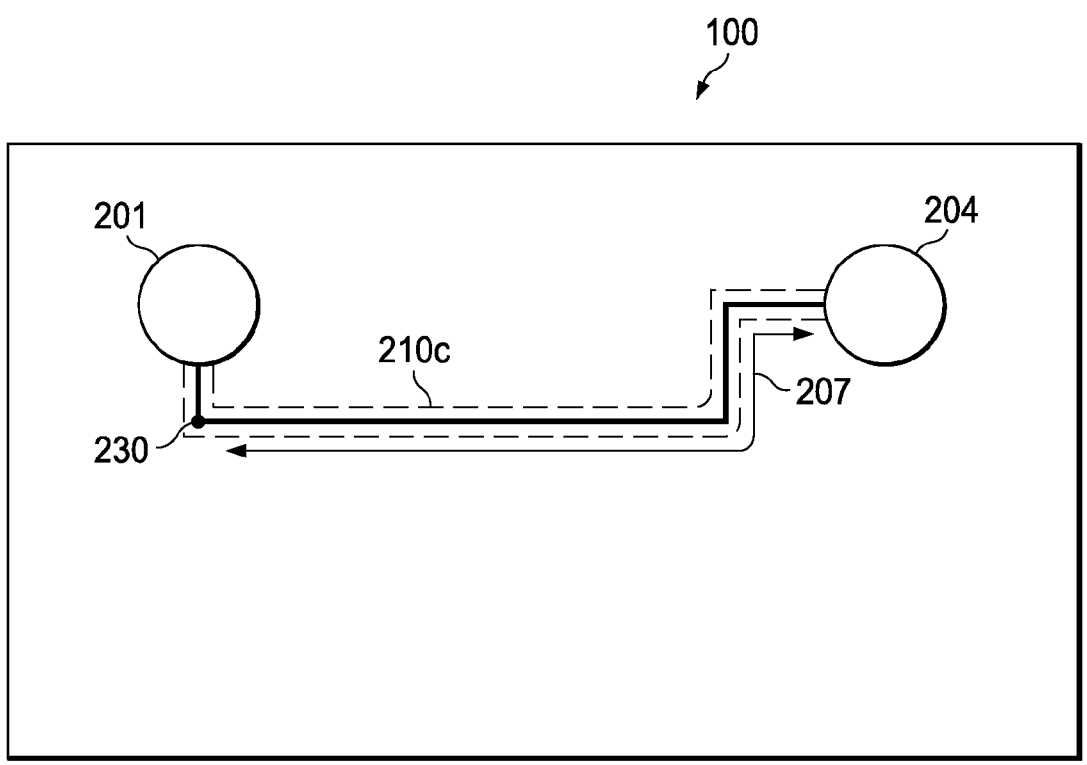
Figure 2E:
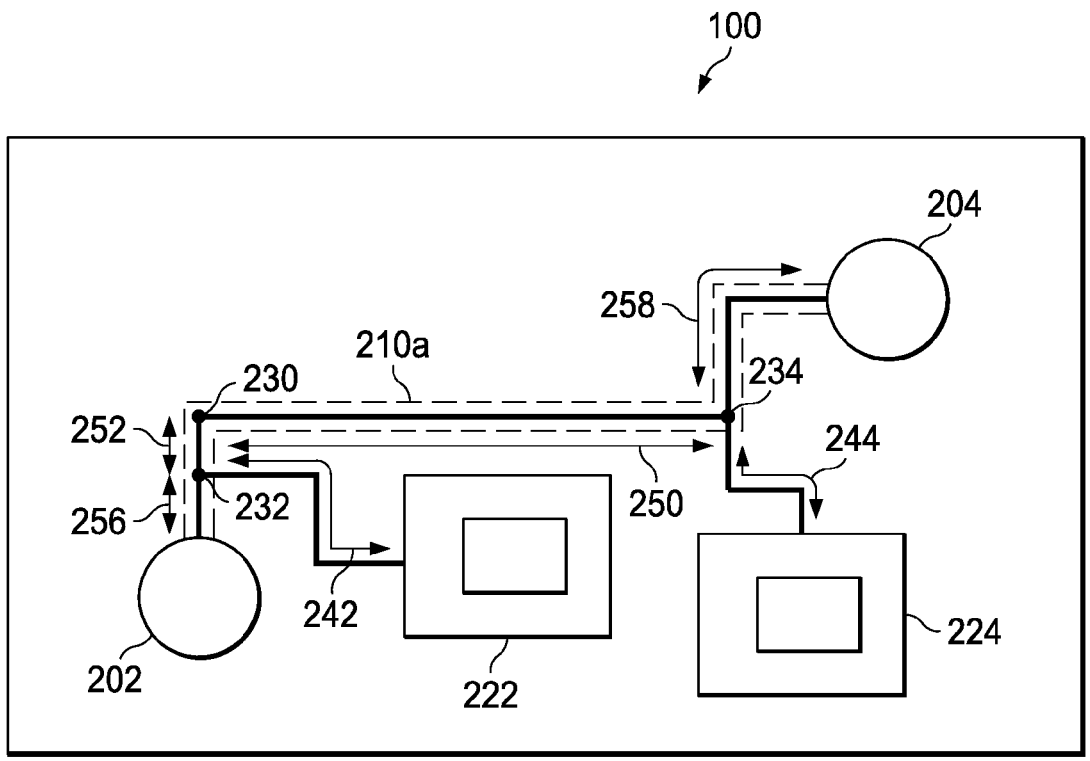

The method 300 (FIG. 3) proceeds to operation 332 to connect the probe pads 222 and 224 to the net 210a, and mark the net 210a as "tested." Referring to FIG. 2E, the probe pads 222 and 224 are connected to the net 210a through two additional nets 242 and 244 respectively. In the present embodiment, the nets 242 and 244 are interconnects (e.g., metal lines) created for testing purposes only, thus referred to as dummy nets. The dummy nets 242 and 244 join the net 210a at two net joints 232 and 234 respectively. A net segment 256 is a portion of the net 210a between the micro-bump 202 and the net joint 232. A net segment 258 is a portion of the net 210a between the micro-bump 204 and the net joint 234. A net segment 250 is a portion of the net 210a between the net joints 230 and 234. A net segment 252 is a portion of the net 210a between the net joints 230 and 232.

The method 300 (FIG. 3) proceeds to operation 334 to update untested length of each net in the set N. For each net n in the set N, if it overlaps with the net 210a, the untested length of the net n is reduced by the length of the overlapping portion. In the present example with reference to FIGS. 2C and 2D, the untested length of the net 210b is reduced by the length of the net segments 252 and 256 (FIG. 2E), and the untested length of the net 210c is reduced by the length of the net segments 250 and 258 (FIG. 2E). Afterwards, the method 300 goes back to operation 318.

The method 300 (FIG. 3) repeats the operations 318, 320, 326, 328, 330, 332 and 334 until either all nets in the set N have been connected to some probe pads and marked as "tested" (operation 318) or all probe pads have been connected to some nets (operation 320). As a result of the method 300, the interposer 100 is implemented with a test structure that offers optimal test coverage based on Equations (1), (2), and (3).

Figure 4A:
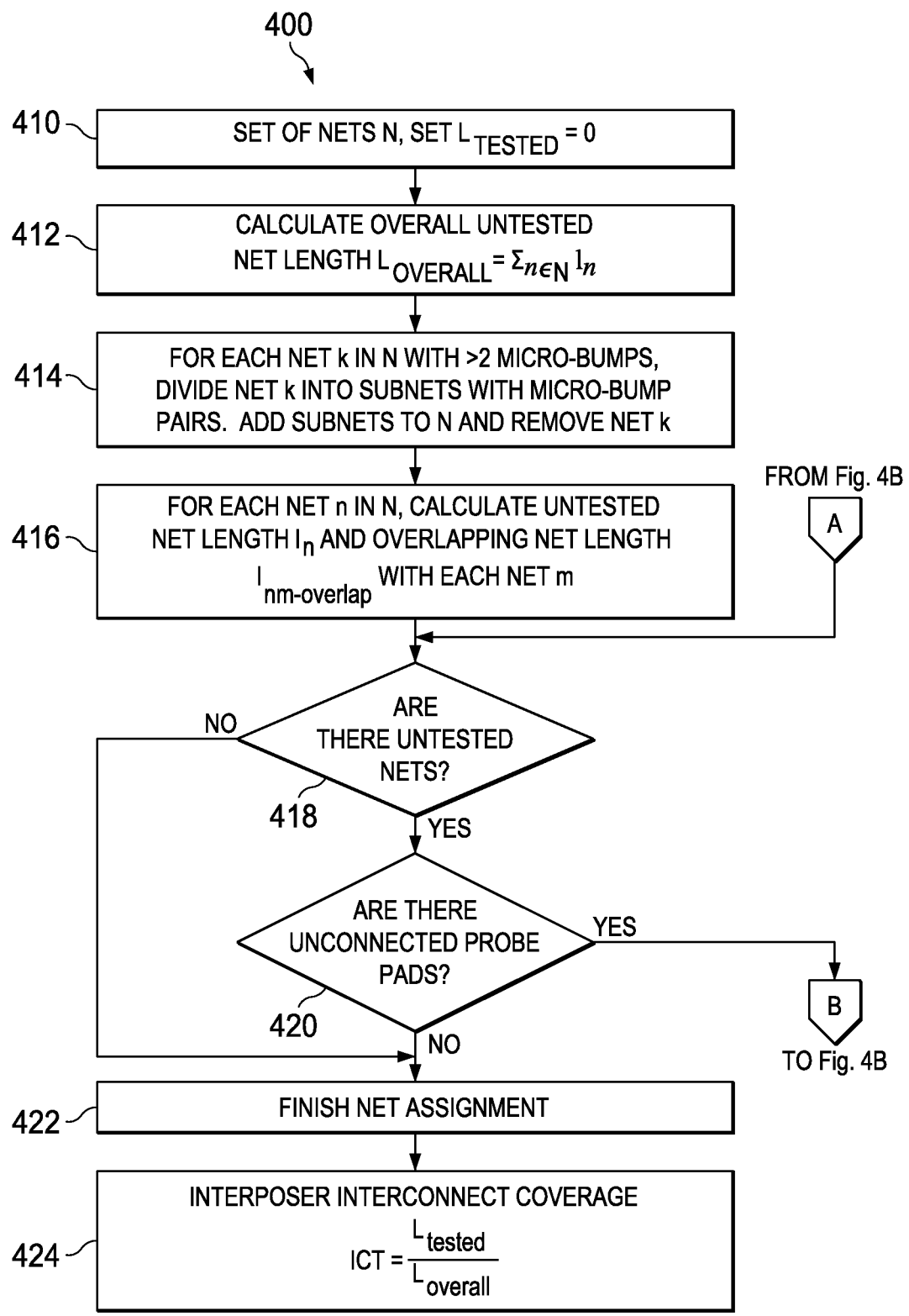
Figure 4B:
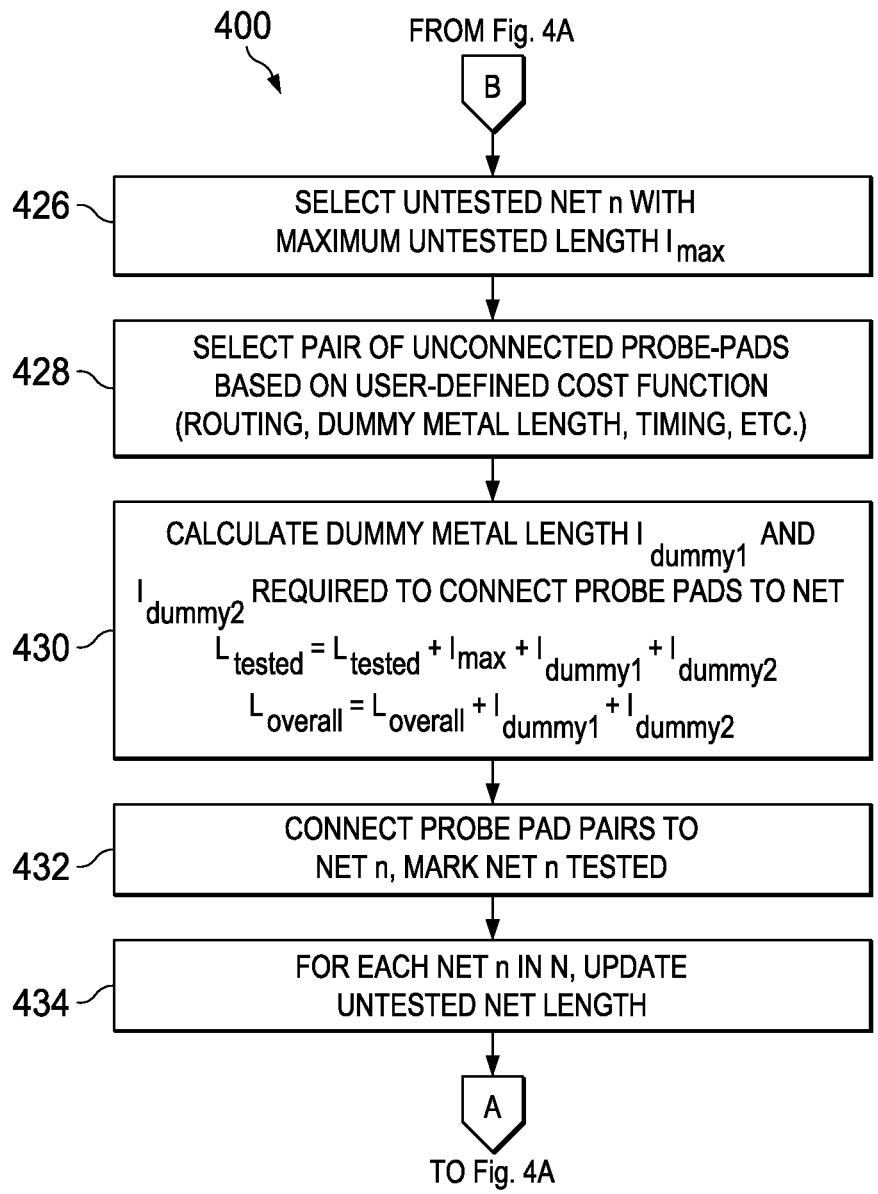

FIGS. 4A and 4B show an embodiment of a method 400 for maximizing ICT of the interposer 100 with $L_{overall}$ and $L_{tested}$ calculated according to various aspects of the present disclosure. Operations 410, 412, 414, 416, 418, 420, 422, 424, 426, 428, 432 and 434 are similar to operations 310, 312, 314, 316, 318, 320, 322, 324, 326, 328, 332 and 334 (FIG. 3) respectively. For simplicity purposes, detailed descriptions of these operations are omitted and some key points are highlighted below.

Operation 410 (FIG. 4A) clears the $L_{tested}$ ($L_{tested}=0$) and initializes a set of nets to be tested, N, to logically include all nets in the interposer 100.

Operation 412 (FIG. 4A) calculates an overall net length to be tested as a summation of the untested length of all nets in the set N:

$$L_{overall} = \sum_{n \in N} l_n \quad (4)$$

Operation 414 (FIG. 4A) replaces the net 210 (FIG. 2A) with the subnets 210a (FIG. 2B), 210b (FIG. 2C), and 210c (FIG. 2D).

Operation 426 (FIG. 4B) selects the net 210a (FIG. 2B), which has the maximum untested length ($l_{max}$) among the untested nets.

Operation 428 (FIG. 4B) selects the probe pads 222 and 224 (FIG. 2B).

The method 400 (FIG. 4B) proceeds to operation 430 to calculate the length of the dummy nets 242 and 244 (FIG. 2E) which are to be used for connecting the probe pads 222 and 224 to the net 210a. In an embodiment, the length of the dummy nets 242 and 244 can be obtained from a design layout data, denoted as $l_{dummy1}$ and $l_{dummy2}$ respectively. The operation 430 further updates the $L_{tested}$ and $L_{overall}$ to include the length of the net 210a and the dummy nets 242 and 244.

$$L_{tested}=L_{tested}+l_{max}+l_{dummy1}+l_{dummy2} \quad (5)$$

$$L_{overall}=L_{overall}+l_{dummy1}+l_{dummy2} \quad (6)$$

The rationale of this operation is that the dummy nets 242 and 244 are also part of the interposer 100 and are subject to similar manufacturing defects as those original nets, such as the net 210a. Therefore, including the dummy nets 242 and 244 in the ICT calculation reflects more accurate defect coverage.

The method 400 (FIG. 4B) proceeds to operation 432 to connect the probe pads 222 and 224 to the net 210a through the dummy nets 242 and 244 respectively (FIG. 2E), and mark the net 210a, including the net segments 250, 252, 256 and 258, as "tested."

The method 400 (FIG. 4B) proceeds to operation 434 to update untested length of each net. For each net n in the set N, if it overlaps with the net 210a, the untested length of the net n is reduced by the length of the overlapping portion. In the present example with reference to FIGS. 2C and 2D, the untested length of the net 210b is reduced by the length of the net segments 252 and 256 (FIG. 2E), and the untested length of the net 210c is reduced by the length of the net segments 250 and 258 (FIG. 2E). Afterwards, the method 400 goes back to operation 418.

The method 400 (FIGS. 4A and 4B) repeats the operations 418, 420, 426, 428, 430, 432 and 434 until either all nets in the set N have been connected to some probe pads and marked as "tested" (operation 418) or all probe pads have been connected to some nets (operation 420). As a result of the method 400, the interposer 100 is implemented with a test structure that offers optimal test coverage based on Equations (1), (4), (5), and (6).

Figure 5A:
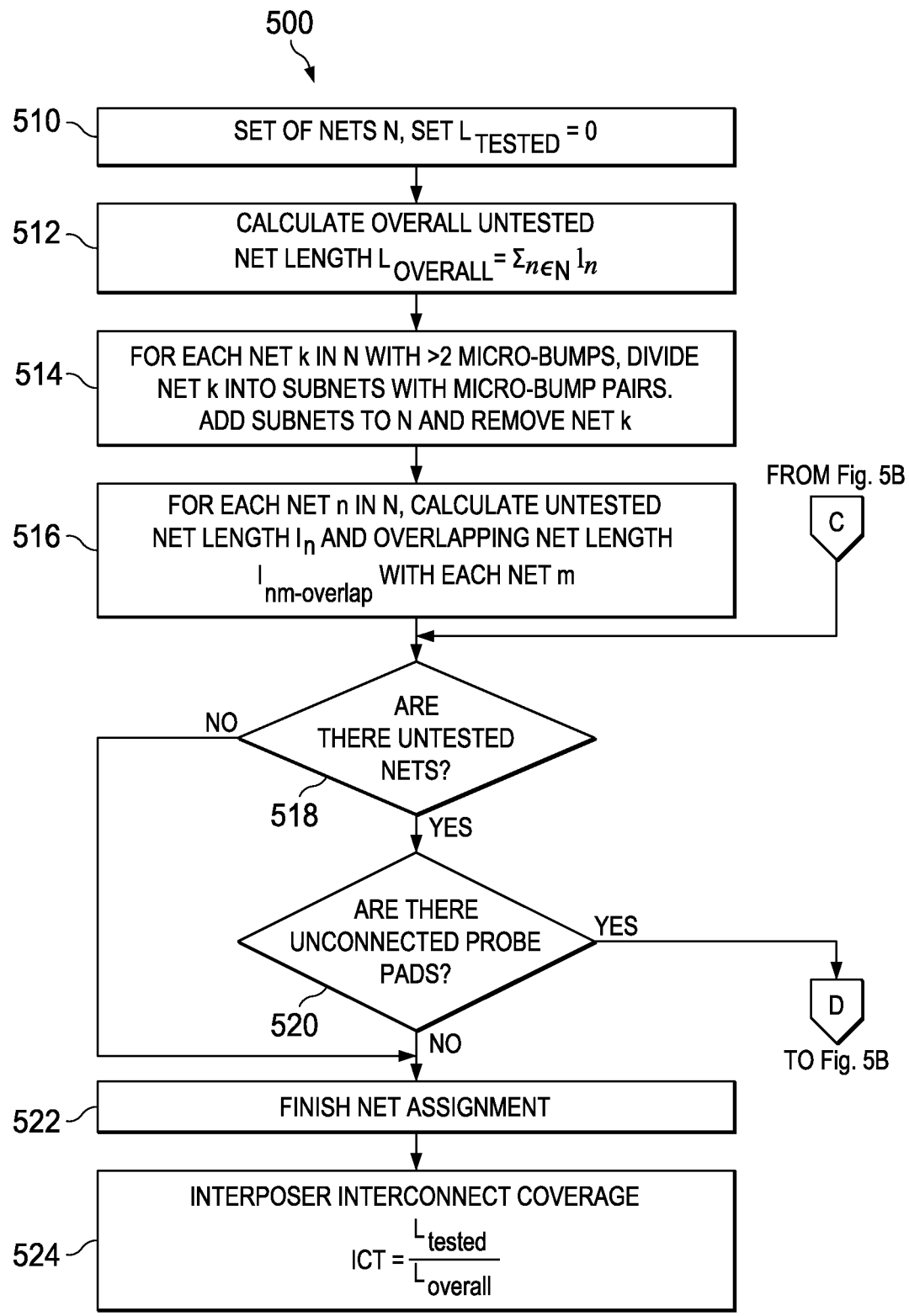
Figure 5B:
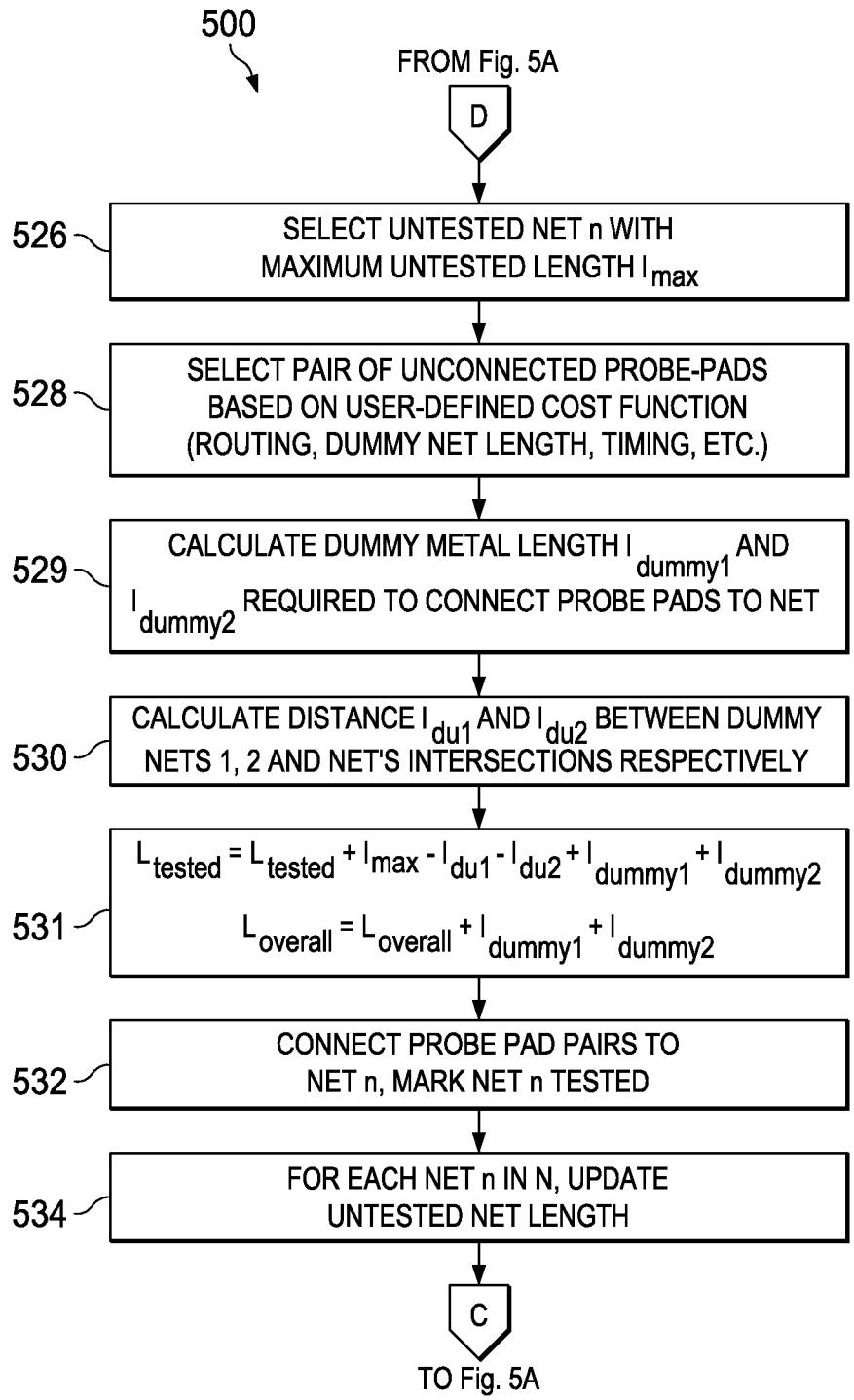

FIGS. 5A and 5B show an embodiment of a method 500 for maximizing ICT of the interposer 100 with $L_{overall}$ and $L_{tested}$ calculated according to various aspects of the present disclosure. Operations 510, 512, 514, 516, 518, 520, 522, 524, 526, 528, 532 and 534 are similar to operations 310, 312, 314, 316, 318, 320, 322, 324, 326, 328, 332 and 334 (FIG. 3) respectively. For simplicity purposes, detailed descriptions of these operations are omitted and some key points are highlighted below.

Operation 510 (FIG. 5A) clears the $L_{tested}$ ($L_{tested}=0$) and initializes a set of nets to be tested, N, to logically include all nets in the interposer 100.

Operation 512 (FIG. 5A) calculates an overall net length to be tested as a summation of the untested length of all nets in the set N:

$$L_{overall} = \sum_{n \in N} l_n \quad (7)$$

Operation 514 (FIG. 5A) replaces the net 210 (FIG. 2A) with the nets 210a (FIG. 2B), 210b (FIG. 2C), and 210c (FIG. 2D).

Operation 526 (FIG. 5B) selects the net 210a (FIG. 2B), which has the maximum untested length ($L_{max}$) among the untested nets.

Operation 528 (FIG. 5B) selects the probe pads 222 and 224 (FIG. 2B).

The method 500 (FIG. 5B) proceeds to operation 529 to calculate the length of the dummy nets 242 and 244 (FIG. 2E) which are to be used for connecting the probe pads 222 and 224 to the net 210a. In an embodiment, the length of the dummy nets 242 and 244 is calculated based on a design layout data, denoted as $l_{dummy1}$ and $l_{dummy2}$ respectively.

The method 500 (FIG. 5B) proceeds to operation 530 to calculate the length of the net segments 256 and 258 (FIG. 2E) which are going to form once the dummy nets 242 and 244 are connected to the net 210a. In an embodiment, the length of the net segments 256 and 258 is calculated based on a design layout data, denoted as $l_{du1}$ and $l_{du2}$ respectively.

The method 500 (FIG. 5B) proceeds to operation 531 to update the $L_{tested}$ and $L_{overall}$ to include the length of the net 210a and the dummy nets 242 and 244, and to exclude the length of the net segments 256 and 258.

$$L_{tested}=L_{tested}+l_{max}-l_{du1}-l_{du2}+l_{dummy1}+l_{dummy2} \quad (8)$$

$$L_{overall}=L_{overall}+l_{dummy1}+l_{dummy2} \quad (9)$$

The rationale of this operation is that the dummy nets 242 and 244 are also part of the interposer 100 and are subject to similar manufacturing defects as those original nets, such as the net 210a. However, any defects on the net segments 256 and 258 are not covered (or tested) by the probe pads 222 and 224. Therefore, including the dummy nets 242 and 244 and excluding the net segments 256 and 258 in the ICT calculation reflects more accurate defect coverage.

The method 500 (FIG. 5B) proceeds to operation 532 to connect the pair of probe pads 222 and 224 to the net 210a through the dummy nets 242 and 244 respectively (FIG. 2E) and mark the net segments 250 and 252 as "tested."

The method 500 (FIG. 5B) proceeds to operation 534 to update untested length of each net. For each net n in the set N, if it overlaps with the net segments 250 and 252, the untested length of the net n is reduced by the length of the overlapping portion. In the present example with reference to FIGS. 2C and 2D, the untested length of the net 210b is reduced by the length of the net segment 252, and the untested length of the net 210c is reduced by the length of the net segment 250. Afterwards, the method 500 goes back to operation 518.

The method 500 (FIGS. 5A and 5B) repeats the operations 518, 520, 526, 528, 529, 530, 531, 532 and 534 until either all nets in the set N have been connected to some probe pads and marked as "tested" (operation 518) or all probe pads have been connected to some nets (operation 520). As a result of the method 500, the interposer 100 is implemented with a test structure that offers optimal test coverage based on Equations (1), (7), (8), and (9).

Figure 6:
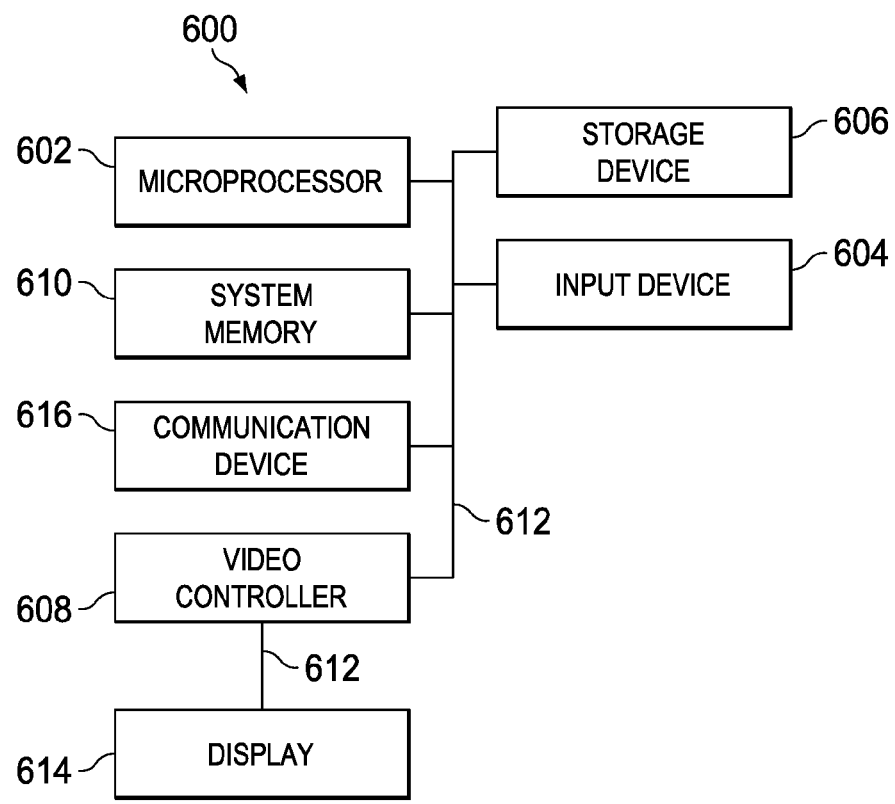
FIG. 6 is an illustration of a computer system for implementing one or more embodiments of the present disclosure.

FIG. 6 shows an illustrative computer system 600 for implementing embodiments of the methods described above, for example, during a design phase or a layout phase of the interposer 100. The computer system 600 includes a microprocessor 602, an input device 604, a storage device 606, a video controller 608, a system memory 610, a display 614, and a communication device 616 all interconnected by one or more buses 612. The storage device 606 could be a floppy drive, hard drive, CD-ROM, optical drive, or any other form of storage device. In addition, the storage device 606 may be capable of receiving a floppy disk, CD-ROM, DVD-ROM, or any other form of computer-readable medium that may contain computer-executable instructions. Further communication device 616 could be a modem, network card, or any other device to enable the computer system to communicate with other nodes. It is understood that any computer system could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip. Accordingly, it should be understood that combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the present disclosure may be embodied in the RAM of a computer to transform a standard computer into a new specific computing machine.

Data structures are defined organizations of data that may enable an embodiment of the present disclosure. For example, a data structure may provide an organization of data, or an organization of executable code. Data signals could be carried across transmission mediums and store and transport various data structures, and, thus, may be used to transport an embodiment of the present disclosure.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

In one exemplary aspect, the present disclosure is directed to a method of assigning a first set of probe pads to an interposer for maximizing a defect coverage for the interposer. The interposer includes a second set of nets interconnecting a plurality of micro-bumps and the defect coverage is based on a ratio between a tested net length and an overall net length. The method includes calculating the overall net length by summing up a length of each net in the second set, and processing the second set such that every net interconnecting more than two micro-bumps is divided into a plurality of nets and every two of the more than two micro-bumps are interconnected by one of the plurality of nets. The method further includes calculating an untested length of each net in the second set and selecting a first net from the second set with the maximum untested length. The method further includes selecting two probe pads from the first set based on a user-defined cost function and connecting the two probe pads to the first net with two dummy nets.

In another exemplary aspect, the present disclosure is directed to a method of designing an interposer in a three-dimensional integrated circuit. The interposer includes a first plurality of nets and a second plurality of probe pads. Each of the first plurality of nets connects at least one micro-bump. The second plurality of probe pads is initially unconnected to the first plurality of nets. The method includes initializing a first variable, a second variable, and a first set of nets, wherein the first variable is initialized to zero, the second variable is initialized to include a summation of a length of each of the first plurality of nets, and the first set is initialized to logically include the first plurality of nets. The method further includes, for each net T in the first set that connects more than two micro-bumps, replacing the net T in the first set with a third plurality of nets such that each of the third plurality of nets is a portion of the net T, each of the third plurality of nets connects only two of the more than two micro-bumps, and every two of the more than two micro-bumps are connected by one of the third plurality of nets. The method further includes calculating an untested length for each net in the first set and selecting a first net N from the first set wherein the first net N has the maximum untested length among all nets in the first set, the first net N representing at least a portion of a net P of the first plurality of nets. The method further includes selecting a pair of probe pads from the second plurality of probe pads that are unconnected to the first plurality of nets and performing a routing in the interposer such that the pair of probe pads are connected to the net P by two dummy nets, wherein the two dummy nets join the net P at two joints.

In another exemplary aspect, the present disclosure is directed to a method of routing an interposer in a three-dimensional integrated circuit. The interposer includes a first set of nets and a second set of even number of probe pads to be connected to the first set. Each net of the first set connects two micro-bumps and has an untested length initially equal to a length of the net between the two micro-bumps. The method includes selecting a first net from the first set wherein the first net has the maximum untested length among all nets in the first set, and selecting two probe pads from the second set based on a user-defined cost function. The method further includes connecting the two probe pads to the first net, and updating the untested length of each net of the first set that overlaps with the first net. The method further includes repeating the selecting steps, the connecting step, and the updating step until a user-defined goal is achieved.

What is claimed is:

1. A method of assigning a first set of probe pads to an interposer for maximizing a defect coverage for the interposer, wherein the interposer includes a second set of nets interconnecting a plurality of micro-bumps and the defect coverage is based on a ratio between a tested net length and an overall net length, comprising the steps of:
    calculating the overall net length by summing up a length of each net in the second set;
    for each net T in the second set that interconnects more than two micro-bumps, replacing T with a plurality of nets such that each of the plurality of nets is a portion of T and connects only two of the more than two micro-bumps, and every two of the more than two micro-bumps are interconnected by one of the plurality of nets;
    calculating an untested length of each net in the second set;
    selecting a first net from the second set with the maximum untested length;
    selecting two probe pads from the first set based on a user-defined cost function; and
    connecting the two probe pads to the first net with two dummy nets, wherein at least one of: the calculating of the overall net length, the replacing of T with the plurality of nets, the calculating of the untested length, the selecting of the first net, the selecting of the two probe pads, and the connecting of the two probe pads is performed by a computing system.

2. The method of claim 1, further comprising the step of:
    updating the untested length of each net m in the second set that has an overlapping portion with the first net by subtracting a length of the overlapping portion from the untested length of the net m.

3. The method of claim 2, further comprising the steps of:
    removing the first net from the second set;
    removing the two probe pads from the first set;
    updating the tested net length; and
    updating the overall net length.

4. The method of claim 3, wherein the updating the tested net length includes adding the untested length of the first net to the tested net length.

5. The method of claim 3, wherein the updating the tested net length includes:
    calculating a first length of a portion of the first net that is in between the two dummy nets; and
    adding the first length to the tested net length.

6. The method of claim 3, wherein:
    the updating the tested net length includes adding both the untested length of the first net and a length of the two dummy nets to the tested net length; and
    the updating the overall net length includes adding the length of the two dummy nets to the overall net length.

7. The method of claim 3, wherein:
    the updating the tested net length includes:
        calculating a first length of a portion of the first net that is in between the two dummy nets; and
        adding both the first length and a length of the two dummy nets to the tested net length; and
    the updating the overall net length includes adding the length of the two dummy nets to the overall net length.

8. The method of claim 3, further comprising:
    repeating the steps of selecting the first net through updating the overall net length until: (a) the first set has less than two probe pads, (b) the number of nets in the second set is less than a predetermined value, or (c) the maximum untested length among all nets in the second set is less than another predetermined value.

9. The method of claim 1, wherein the user-defined cost function is based at least on: (a) a routing resource of the interposer, (b) a length of dummy nets for connecting the two probe pads to the first net, (c) a timing constraint of the first net, or (d) a combination thereof.

10. A method of assigning a first set of probe pads to an interposer for maximizing a defect coverage for the interposer, wherein the interposer includes a second set of nets interconnecting a plurality of micro-bumps, comprising the steps of:
    calculating an overall net length by summing up a length of each net in the second set;
    for each net T in the second set that interconnects more than two micro-bumps, replacing T with a plurality of nets such that each of the plurality of nets is a portion of T and connects only two of the more than two micro-bumps, and every two of the more than two micro-bumps are interconnected by one of the plurality of nets;
    calculating an untested length of each net in the second set;
    selecting a first net from the second set with the maximum untested length;
    selecting two probe pads from the first set based on a user-defined cost function;
    connecting the two probe pads to the first net with two dummy nets;
    updating the untested length of each net m in the second set that has an overlapping portion with the first net by subtracting a length of the overlapping portion from the untested length of the net m;
    updating a tested net length;
    updating the overall net length, wherein the defect coverage is based on a ratio between the tested net length and the overall net length; and
    storing an updated layout of the interposer including the connected probe pads in a tangible computer-readable medium for manufacturing the interposer.

11. The method of claim 10, wherein the updating the tested net length includes adding the untested length of the first net to the tested net length.

12. The method of claim 10, wherein the updating the tested net length includes:
    calculating a first length of a portion of the first net that is in between the two dummy nets; and
    adding the first length to the tested net length.

13. The method of claim 10, wherein:
    the updating the tested net length includes adding both the untested length of the first net and a length of the two dummy nets to the tested net length; and
    the updating the overall net length includes adding the length of the two dummy nets to the overall net length.

14. The method of claim 10, wherein the updating the tested net length includes:
    calculating a first length of a portion of the first net that is in between the two dummy nets; and
    adding both the first length and a length of the two dummy nets to the tested net length.

15. The method of claim 10, wherein the user-defined cost function considers at least: a routing congestion of the interposer, a length of dummy nets to be inserted for connecting the two probe pads to the first net, a timing constraint of the first net, or a combination thereof.

16. The method of claim 10, further comprising:
repeating the steps of selecting the first net through the updating the overall net length until the defect coverage reaches a user-defined goal.

17. A method of assigning a first set of probe pads to an interposer, the interposer having a second set of nets interconnecting a plurality of micro-bumps, comprising the steps of:
for each net T in the second set that interconnects more than two micro-bumps, replacing T with a plurality of nets such that each of the plurality of nets is a portion of T and connects only two of the more than two micro-bumps, and every two of the more than two micro-bumps are interconnected by one of the plurality of nets;
calculating an untested length of each net in the second set;
selecting a first net from the second set with the maximum untested length;
selecting two probe pads from the first set; and
connecting the two probe pads to the first net, wherein at least one of: the replacing of T with the plurality of nets, the calculating of the untested length, the selecting of the first net, the selecting of the two probe pads, and the connecting of the two probe pads is performed by a computing system.

18. The method of claim 17, further comprising:
updating the untested length of each net m in the second set that has an overlapping portion with the first net by subtracting a length of the overlapping portion from the untested length of the net m.

19. The method of claim 18, further comprising, after the connecting the two probe pads to the first net:
removing the first net from the second set; and
removing the two probe pads from the first set.

20. The method of claim 19, further comprising:
repeating the steps of selecting the first net through updating the untested length until: (a) the first set has less than two probe pads, or (b) the number of nets in the second set is less than a predetermined value, or (c) the maximum untested length among all nets in the second set is less than another predetermined value.

* * * * *